United States Patent
Paul et al.

(10) Patent No.: US 9,060,172 B2
(45) Date of Patent: Jun. 16, 2015

(54) METHODS AND SYSTEMS FOR MIXED SPATIAL RESOLUTION VIDEO COMPRESSION

(75) Inventors: Walter Paul, Belle Mead, NJ (US); Arkady Kopansky, Havertown, PA (US); Hui Cheng, Bridgewater, NJ (US)

(73) Assignee: SRI International, Menlo Park, CA (US)

( * ) Notice: Subject to any disclaimer, the term of this patent is extended or adjusted under 35 U.S.C. 154(b) by 2720 days.

(21) Appl. No.: 11/521,830

(22) Filed: Sep. 15, 2006

(65) Prior Publication Data

US 2007/0058724 A1 Mar. 15, 2007

Related U.S. Application Data

(60) Provisional application No. 60/717,496, filed on Sep. 15, 2005.

(51) Int. Cl.
| | |
|---|---|
| *H04N 7/12* | (2006.01) |
| *H04N 19/36* | (2014.01) |
| *H04N 19/105* | (2014.01) |
| *H04N 19/147* | (2014.01) |
| *H04N 19/60* | (2014.01) |
| *H04N 19/154* | (2014.01) |

(Continued)

(52) U.S. Cl.
CPC ............ *H04N 19/36* (2014.11); *H04N 19/105* (2014.11); *H04N 19/147* (2014.11); *H04N 19/60* (2014.11); *H04N 19/154* (2014.11); *H04N 19/19* (2014.11); *H04N 19/59* (2014.11)

(58) Field of Classification Search
None
See application file for complete search history.

(56) References Cited

U.S. PATENT DOCUMENTS 5,289,548 A * 2/1994 Wilson et al. ............... 382/250
5,473,377 A 12/1995 Kim (Continued)

OTHER PUBLICATIONS

Frajka, "Image Coding Subject to Constraints," Ph.D. Thesis, Univ. of California, San Diego, (2003).

(Continued)

*Primary Examiner* — Frederick Bailey
(74) *Attorney, Agent, or Firm* — Moser Taboada

(57) ABSTRACT

A method for encoding a frame of visual data which includes the steps of encoding an original full resolution frame, storing coded data for the encoded full resolution frame, reconstructing and storing encoded full resolution frame, downsampling the original full resolution frame to render it a reduced spatial resolution frame, encoding the reduced spatial resolution frame, storing coded data for the reduced spatial resolution frame, reconstructing and storing the reduced spatial resolution frame, upsampling and storing the reconstructed reduced spatial resolution frame, comparing a characteristic in the reconstructed full resolution frame with said characteristic in the original full resolution frame to determine the deviation of the reconstructed full resolution frame from the original full resolution frame with respect to said characteristic, comparing said characteristic in the upsampled reconstructed spatial reduced resolution frame with said characteristic in the original full resolution frame to determine the deviation of the upsampled reconstructed spatial reduced resolution frame from the original full resolution frame with respect to said characteristic, selecting the frame with the lesser deviation from the original full resolution frame with respect to said characteristic, and outputting the coded data corresponding to the frame with the lesser deviation from the original full resolution frame with respect to said characteristic to the bitstream.

18 Claims, 2 Drawing Sheets

(51) Int. Cl.
*H04N 19/19* (2014.01)
*H04N 19/59* (2014.01)

(56) References Cited

U.S. PATENT DOCUMENTS

| | | | |
|---|---|---|---|
| 5,646,686 | A | 7/1997 | Pearlstein |
| 6,907,073 | B2 * | 6/2005 | Sawhney et al. ......... 375/240.14 |
| 7,006,662 | B2 * | 2/2006 | Alattar et al. ................. 382/100 |
| 2001/0012324 | A1 * | 8/2001 | Normile .................. 375/240.05 |
| 2003/0103166 | A1 | 6/2003 | MacInnis et al. |
| 2004/0252903 | A1 | 12/2004 | Chen et al. |
| 2005/0157799 | A1 | 7/2005 | Raman et al. |
| 2006/0268991 | A1 * | 11/2006 | Segall et al. ............. 375/240.24 |
| 2007/0121719 | A1 * | 5/2007 | Van Der Schaar et al. 375/240.1 |
| 2009/0213926 | A1 * | 8/2009 | Shin et al. .................. 375/240.2 |

OTHER PUBLICATIONS

Jain, A., "Fundamentals of Digital Image Processing," Prentice Hall, (1989).

* cited by examiner

METHODS AND SYSTEMS FOR MIXED SPATIAL RESOLUTION VIDEO COMPRESSION

CROSS-REFERENCE TO RELATED APPLICATIONS

This application claims the benefit of U.S. Provisional Application 60/717,496, filed Sep. 15, 2005. The entire disclosure of U.S. Provisional Application Ser. No. 60/717,496 is heeby incorporated herein by reference.

FIELD OF THE INVENTION

Embodiments of the present invention generally relate to systems and methods for video compression.

BACKGROUND OF THE INVENTION

Video compression refers to reducing the quantity of data used to represent video content while reducing the quality as little as possible.

Digital video requires high data rates—the better the picture, the more data is ordinarily needed. Thus, powerful hardware and considerable bandwidth are normally required when video is transmitted. However, much of the data in video is not necessary for achieving good perceptual quality because it can be easily predicted. For example, successive frames in a movie rarely change much from one to the next—this makes video well suited for compression. Video compression can make video files far smaller with little perceptible loss in quality. For example, DVDs use a video coding standard called MPEG-2 that makes the movie 15 to 30 times smaller while still producing a picture quality that is generally considered high quality for standard-definition video. Without proper use of data compression techniques, either the picture quality for a given video would look much worse, or the video would require more disk space.

Video is essentially a three-dimensional array of color pixels. Two dimensions serve as the spatial (horizontal and vertical) directions of the moving pictures, and one dimension represents the time domain. A frame is a set of all pixels that correspond to a single point in time. Essentially, a frame is the same as a conventional still picture.

Video data contains spatial and temporal redundancy. Similarities can thus be encoded by merely registering differences within a frame (spatial) and/or between frames (temporal).

Better compression techniques allow, for instance, a service provider to offer additional or new services to customers; in some cases better compression may allow service providers to offer service to new customers, who could not be served otherwise. Thus, there is a need for an improved system and method for improved video compression efficiency.

SUMMARY OF THE INVENTION

Embodiments of the present invention address these and other needs and generally relate to methods for identifying video frames whose spatial resolution can be reduced and then re-interpolated without visible quality degradation.

Embodiments of the present invention also generally relate to a video codec that takes advantage of the ability to improve video compression efficiency by selectively reducing the spatial resolution of all or part of a video sequence before encoding.

Embodiments of the present invention also include a method for encoding a frame of visual data. The method includes the steps of generating a reconstructed full resolution frame and coded data corresponding to the reconstructed full resolution frame from an original full resolution fame, generating an upsampled reconstructed reduced spatial resolution frame and coded data corresponding to the upsampled reconstructed reduced spatial resolution frame from the original full resolution frame, comparing at least one characteristic in the reconstructed full resolution frame with said at least one characteristic in the original full resolution frame to determine the deviation of the reconstructed full resolution frame from the original full resolution frame with respect to said at least one characteristic, comparing said at least one characteristic in the upsampled reconstructed reduced spatial reduced resolution frame with said at least one characteristic in the original full resolution frame to determine the deviation of the upsampled reconstructed reduced spatial reduced resolution frame from the original full resolution frame with respect to said at least one characteristic, selecting the frame with the lesser deviation with respect to said at least one characteristic from the original full resolution frame, outputting the coded data corresponding to the frame with the lesser deviation with respect to said characteristic from the original full resolution frame to the bitstream.

BRIEF DESCRIPTION OF THE DRAWINGS

Embodiments of the present invention will be more readily understood from the detailed description of exemplary embodiments presented below considered in conjunction with the attached drawings, of which.

It is to be understood that the attached drawings are for purposes of illustrating the concepts of the invention and may not be to scale.

DETAILED DESCRIPTION OF THE INVENTION

Frame-Level Mixed Spatial Resolution Encoding

Figure 1:
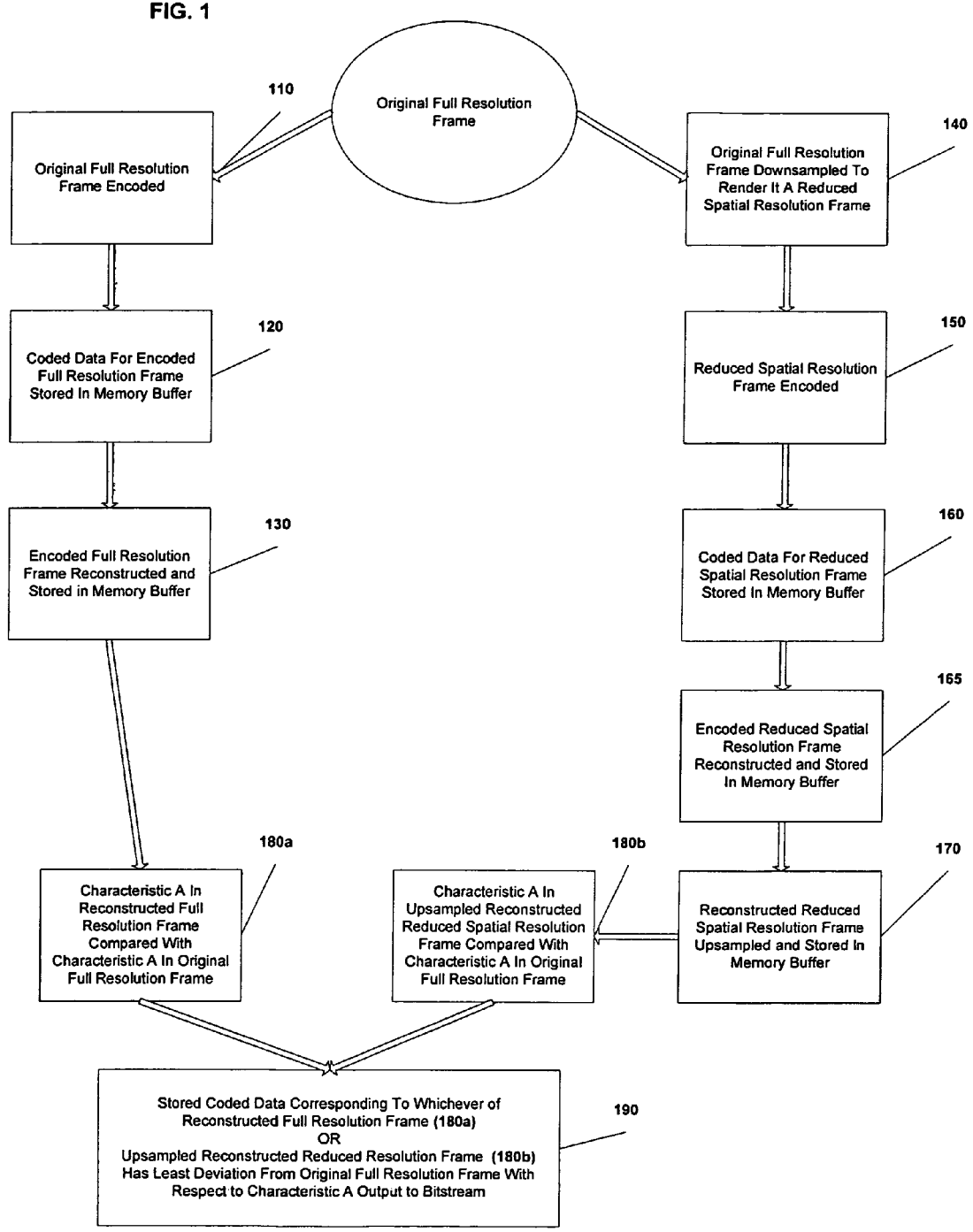
FIG. 1 is a flow diagram of an embodiment of the encoder of the present invention.

With reference to FIG. 1, a frame is encoded twice. In step 110, an original full resolution frame is encoded using any standard codec known to those of skill in the art. As it is used herein, the term "original full resolution frame" is intended to include, but is not limited to, an input frame. The terms "input frame" and "encode" are known to those of skill in the art. In step 120, coded data for the encoded full resolution frame is stored in a memory buffer. Memory buffers are known to those of skill in the art. In step 130, the encoded full resolution frame is reconstructed and stored in a memory buffer. The term "reconstructed" is known to those of skill in the art.

In step 140, the original full resolution frame is downsampled to a reduced spatial resolution frame and, in step 150, this reduced spatial resolution frame is encoded. In step 160, the coded data for the encoded reduced spatial resolution frame is stored in a memory buffer. In step 165 the encoded reduced spatial resolution frame is reconstructed and stored in a memory buffer. In step 170, the reconstructed encoded reduced spatial resolution frame is upsampled and stored in a memory buffer.

In step 180a, a characteristic in the reconstructed full resolution frame is compared with the same characteristic in the original full resolution frame and, in step 180b, this characteristic in the upsampled reconstructed reduced spatial resolution frame is compared with this characteristic the original full resolution frame. In step 190, the stored coded data corresponding to whichever of the reconstructed full resolution frame or the reconstructed upsampled reduced resolution frame that has the least deviation from the original full resolution frame with respect to this characteristic is output to bitstream.

There are a number of ways to make the decision regarding which frame has a lesser deviation from the original full resolution frame. According to an embodiment of the present invention, one factor one factor to consider in comparing to find the least deviation is cost (J), which may be described as follows:

Let the cost of coding a frame in a particular mode (i.e., at full or reduced resolution) be defined as $$J=D+\lambda R,$$

where D is distortion, R is rate in bits (that is, the number of bits needed to code the frame), and $\lambda$ is the Lagrangian multiplier. The distortion, D, can be computed, for example, as the sum of squared differences between the original frame and the reconstructed frame (either full resolution or the upsampled reduced resolution). In this example, $$D = \sum_i \sum_j (x(i,j) - y(i,j))^2,$$

where x(i, j) is the original and y(i, j) is the reconstructed value of the frame pixel at position (i,j). The frame is coded at reduced spatial resolution if $$J_{reduced\ resolution} < J_{full\ resolution}$$

and at full resolution otherwise. To obtain improved perceived visual quality, distortion D can be computed using any perceptual visual quality metric. Exemplary, metrics include just noticeable difference ("JND") metric.

A simpler approach may be needed, however, due to complexity constraints. Thus, Discrete Cosine Transform (DCT)-based downsampling/upsampling combination may be used for downsampling in the mixed spatial resolution coding in embodiments of the present invention. Further, although other factors are possible, for purposes of this example, assume the following constraints: 1) the downsampling is by a factor of 2 in both the horizontal and the vertical direction; 2) the frame size is Q×P; and 3) both Q and P are divisible by an even number (N) in each direction. Thus, each full size frame includes a number of blocks (defined as "num_blks") equal to Q×P/N×N blocks. Let $$X_1[k_1,k_2], 0 \le k_1, k_2 < N$$

be the DCT coefficients of a single N×N block in the full-size frame and $X_2[k_1, k_2] = X_1[k_1, k_2]$, for $0 \le k_1, k_2 < N/2$ and 0 otherwise.
Define $$J = \frac{100 \cdot E_2}{num\_blks}$$

where $D_2$ is the absolute and $E_1$ is the relative measure of high-frequency detail loss for the block $0 \le blk < num\_blks$. Furthermore, $$I_1(blk)=1, \text{ if } E_1(blk) > \text{Threshold\_1 and 0 otherwise}$$

is an indicator function set to 1 if the amount of high frequency detail loss exceeds a specified threshold, Threshold_ 1, and to 0 otherwise.

$$D_1(blk) = \sum_{k_1=0}^{N-1} \sum_{k_2=0}^{N-1} (X_1[k_1, k_2])^2,$$

$$D_2(blk) = \sum_{k_1=0}^{N-1} \sum_{k_2=0}^{N-1} (X_1[k_1, k_2] - X_2[k_1, k_2])^2,$$

and $$E_1(blk) = \frac{100 \cdot D_2(blk)}{D_1(blk)},$$

and, finally, $$E_2 = \sum_{blk=0}^{num\_blks-1} I_1(blk)$$

which indicates the percentage of N×N blocks in an entire frame that have high-frequency detail loss exceeding Threshold_1. A decision to code at reduced resolution is made if J<Threshold_2 and to not downsample otherwise. Note that Threshold_1 and Threshold_2 can be adaptively adjusted.

It should be noted that, regardless of the resolution at which a frame is transmitted, if the frame is used as a reference, both the full resolution and the reduced-resolution representation of the frame are stored in the decoded picture buffer (DPB). Thus, if a particular frame is encoded at full resolution, its reconstructed version is also downsampled and this reduced resolution frame is stored in the DPB along with the full resolution frame. If a frame is encoded at reduced spatial resolution, the reconstructed reduced-resolution frame is upsampled and this full resolution frame is stored in DPB together with the reduced resolution frame. This allows the use of proper reference for subsequent frames coded at either full or reduced resolution.

An additional constraint may be imposed on frame mode decision in embodiments of the present invention to avoid undesirable flicker due to significantly varying frame-to-frame video quality. Let F and R denote full resolution frame and upsampled reduced resolution frame, respectively. If there is significant difference in quality between temporally close full and reduced resolution frames, the video may appear to be flickering when viewed. For example, . . . FRFR-FRFR . . . may be undesirable. To avoid this issue, the following constraint may be imposed: changing the resolution at which a frame is coded is only allowed when q preceding frames are coded at the same resolution. Thus, if q=2 and "*" denotes current frame to be coded, for the sequence fragments . . . FF* . . . or . . . RR* . . . , either *=F or *=R are acceptable. However, a sequence fragment of . . . FR* . . . can only be coded as . . . FRR . . . and . . . RF* . . . can only be coded as . . . RFF . . . . As such, a reasonable range for q is between 1 and 8. Clearly, if q=1 then resolution can be changed for every frame to be coded.

Frame-Level Mixed Spatial Resolution Decoding

Figure 2:
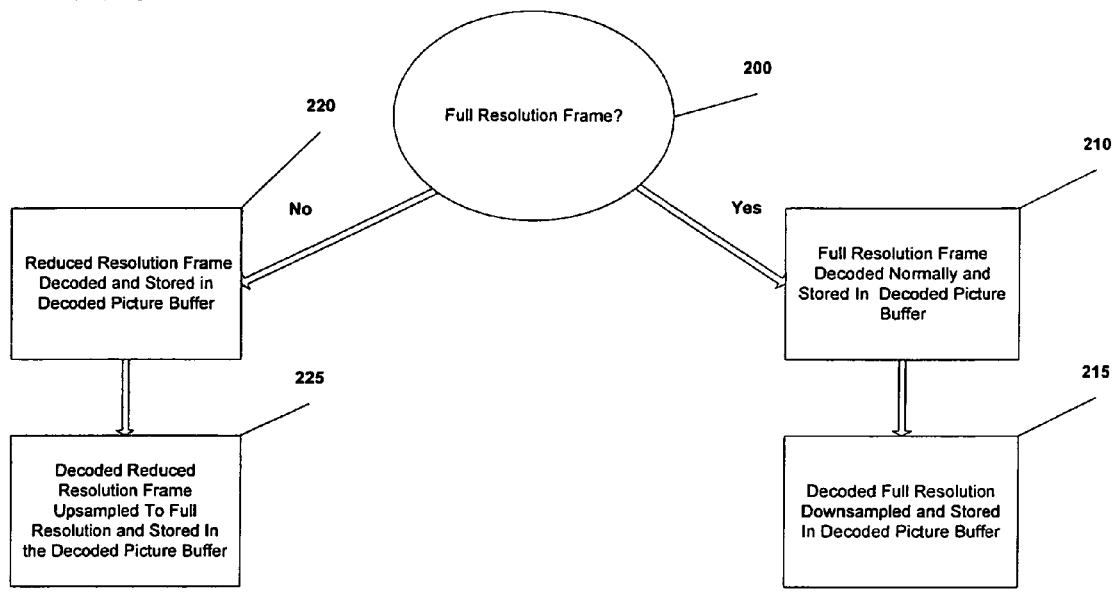
FIG. 2 is a flow diagram of a decoder that may be used with an embodiment of an encoder of the present invention.

FIG. 2 is a flow diagram of the steps taken by the mixed spatial resolution decoder to decode one frame encoded using the encoder of FIG. 1. In step 200, the decoder will determine whether a full resolution or a reduced resolution coded frame was transmitted. If a full resolution frame was transmitted, then, in step 210, is decoded normally and stored in the DPB. In step 215, the decoded full resolution frame is downsampled and also stored in the DPB. If a reduced resolution frame was transmitted, then in step 220, the reduced resolution frame is decoded and stored in the DPB. In step 225, the decoded reduced resolution frame is upsampled to full resolution and stored in the DPB. Note that the downsampling and upsampling filters used by the decoder must match those used by the encoder.

Optional Macroblock-Level Mixed Spatial Resolution Encoding and Decoding

Tweening-Based Spatial Interpolation ("TBSI") can be optionally employed in combination with any chosen codec to further improve compression efficiency. As it is used herein, the term "tweening" is short for "in-betweening" and is intended to include, but is not limited to the process of generating intermediate frames between two images to give the appearance that the first image evolves smoothly into the second image. TBSI is known to those of skill in the art.

The additional compression efficiency gains are possible due to the fact that for some frames that could not be upsampled directly (as would be the case for the frame-level mixed resolution system), TBSI can used to recover detail lost due to spatial resolution reduction for some or all macroblocks. Another upsampling method may be used for the remaining macroblocks to be upsampled.

The encoder proceeds as follows. Since, as before, each frame can be coded at either full or reduced spatial resolution, the encoder encodes each frame at both full resolution and at reduced resolution using any suitable codec known to those in the art. For the frame coded at reduced resolution an additional step takes place as compared with the frame-level decision on coded frame resolution. Reconstructed reduced resolution frames are upsampled to full resolution using a combination of TBSI and direct macroblock upsampling. For each macroblock, the TBSI mode decision determines whether or not lost details can be recovered. Only information that is available to the decoder (i.e. the previously decoded full size frame and the current reduced resolution decoded frame to be upsampled) is used to make TBSI mode decisions and thus no macroblock-level signaling is necessary. Macroblocks for which lost details cannot be recovered using TBSI are directly upsampled using any suitable approach. Upsampled reconstructed frames obtained as a result of the encoding are used to compare and decide, based, for instance, on whether coded data for either the full resolution or the reduced resolution frame is transmitted.

In embodiments of the present invention, the mixed spatial resolution decoder may use TBSI as a support to decode one frame. The decoder will determine whether a full resolution or a reduced resolution frame was transmitted. If a full resolution frame was transmitted, it is decoded normally. If a reduced resolution frame was transmitted, the reduced resolution frame isdecoded, then upsampled to full resolution using TBSI or direct approach, depending on TBSI mode decisions which the decoder makes, duplicating the mode decisions made at the encoder.

Resampling

Although any downsampling/upsampling approach may be used in embodiments of the current mixed spatial resolution system, resampling algorithm choice will affect system performance. While other resampling approaches can also be used, exemplary possibilities are bilinear-, discrete cosine transform- (DCT-), and wavelet-based resampling algorithms. Of these, DCT-based resampling offers substantial performance advantages over the bilinear resampling while providing reasonable complexity. Wavelet-based resampling is capable of providing small additional gains over DCT-based resampling but at the cost of significantly increased complexity. Thus, DCT is a reasonable choice, as it provides a good compromise between performance and complexity.

DCT has a number of useful properties, including compression (energy compaction) performance that is close to that of the optimal Karhunen-Loeve Transform (KLT) for the "highly correlated first-order Markov sequence" (A. Jain, *"Fundamentals of Digital Image Processing"*, Prentice Hall, 1989) and a number of fast implementation algorithms. Because of the need to process compressed video, a number of techniques were developed for video manipulation directly in the compressed domain. DCT is also useful for resampling (i.e. downsampling and/or upsampling) and generally provides much better performance than bilinear interpolation for a wide range of images. (See e.g., Frajka "Image Coding Subject to Constraints", Ph.D. Thesis, Univ. of California, San Diego, Chapter 9 (2003)).

The N×N two-dimensional (forward) DCT transform is defined as:

$$X[k_1, k_2] = \alpha[k_1]\alpha[k_2]\sum_{n_1=0}^{N-1}\sum_{n_2=0}^{N-1} x[n_1, n_2]\cos\left(\frac{\pi(2n_1+1)k_1}{2N}\right)\cos\left(\frac{\pi(2n_2+1)k_2}{2N}\right),$$

for $0 \le k_1, k_2 \le N-1$.

The inverse DCT is defined as:

$$x[n_1, n_2] = \sum_{k_1=0}^{N-1}\sum_{k_2=0}^{N-1} \alpha[k_1]\alpha[k_2]X[k_1, k_2]\cos\left(\frac{\pi(2n_1+1)k_1}{2N}\right)\cos\left(\frac{\pi(2n_2+1)k_2}{2N}\right),$$

for $0 \le n_1, n_2 \le N-1$. In the above equations $$\alpha[0] \triangleq \sqrt{\frac{1}{N}}$$

and $$\alpha[k] \triangleq \sqrt{\frac{2}{N}}$$

for $1 \le k < N-1$.

The algorithm can be modified for resampling in embodiments of the present invention by a factor other than 2. For color sources, as is the case for most video, the algorithm is separately applied to each component. Most image and video coding standards use 8×8 DCT and thus much of the research into DCT-based resampling concentrated on compressed source data given in the form of 8×8 DCT coefficients. For the purposes of embodiments of the present invention, resampling is independent from compression. In embodiments of the present invention, there is no restriction on the DCT size, and as such, employing a larger size DCT for both downsampling and upsampling provides measurable performance advantages. A good compromise for downsampling is provided by a combination of 16×16/8×8 DCT for downsampling and 8×8/16×16 DCT for upsampling (N=8)

It is to be understood that the exemplary embodiments are merely illustrative of the invention and that many variations of the above-described embodiments can be devised by one skilled in the art without departing from the scope of the invention. It is therefore intended that all such variations be included within the scope of the following claims and their equivalents.

What is claimed is:

1. A computer implemented method of video compression, the method comprising the steps of:
generating a reconstructed full resolution frame and coded data corresponding to the reconstructed full resolution frame from an original full resolution frame;
generating an upsampled reconstructed reduced spatial resolution frame and coded data corresponding to the upsampled reconstructed reduced spatial resolution frame from the original full resolution frame;
determining a first deviation by comparing at least one characteristic in the reconstructed full resolution frame with said at least one characteristic in the original full resolution frame;
determining a second deviation by comparing said at least one characteristic in the upsampled reconstructed reduced spatial reduced resolution frame with said at least one characteristic in the original full resolution frame; and
outputting the coded data corresponding to the reconstructed full resolution frame when the first deviation is less than the second deviation; otherwise
outputting the coded data corresponding to the upsampled reconstructed reduced spatial reduced resolution frame.

2. The method of claim 1, wherein generating the reconstructed full resolution frame and coded data corresponding to the reconstructed full resolution frame includes the steps of:
encoding the original full resolution frame to generate an encoded full resolution frame,
storing coded data for the encoded full resolution frame, and
reconstructing and storing the encoded full resolution frame.

3. The method of claim 1, wherein generating the reconstructed reduced spatial resolution frame and coded data corresponding to the reconstructed reduced spatial resolution frame comprises the steps of:
downsampling the original full resolution frame to render the original full resolution frame into a reduced spatial resolution frame,
encoding the reduced spatial resolution frame,
storing coded data for the reduced spatial resolution frame,
reconstructing and storing the reduced spatial resolution frame, and
upsampling and storing the reconstructed reduced spatial resolution frame.

4. The method of claim 2, wherein the step of encoding the original full resolution frame further comprises the step of applying discrete cosine transform-based downsampling to the original full resolution frame.

5. The method of claim 3, wherein the step of encoding the reduced spatial resolution frame further comprises the step of applying discrete cosine transform-based upsampling to the reduced spatial resolution frame for encoding.

6. The method of claim 3, wherein the step of upsampling and storing the reconstructed reduced spatial resolution frame further comprises the step of applying tweening-based spatial interpolation to the reconstructed reduced spatial resolution frame.

7. The method of claim 1, wherein the coded data corresponding to the reconstructed full resolution frame and the coded data corresponding to the upsampled reconstructed reduced spatial resolution frame are each stored in a memory buffer.

8. The method of claim 1, wherein the first deviation and the second deviation are each determined based on a visual-perceptual metric.

9. The method of claim 8, wherein the visual-perceptual metric is a just noticeable difference metric.

10. A system for video compression, comprising:
a full resolution encoder for generating a reconstructed full resolution frame and coded data corresponding to the reconstructed full resolution frame from an original full resolution frame;
a reduced resolution encoder for generating an upsampled reconstructed reduced spatial resolution frame and coded data corresponding to the upsampled reconstructed reduced spatial resolution frame from the original full resolution frame; and
a decision component for:
determining a first deviation by comparing at least one characteristic in the reconstructed full resolution frame with said at least one characteristic in the original full resolution frame
determining a second deviation by comparing said at least one characteristic in the upsampled reconstructed reduced spatial reduced resolution frame with said at least one characteristic in the original full resolution frame; and
outputting the coded data corresponding to the reconstructed full resolution frame when the first deviation is less than the second deviation; otherwise
outputting the coded data corresponding to the upsampled reconstructed reduce spatial reduced resolution frame.

11. The system of claim 10, wherein generating the reconstructed full resolution frame and coded data corresponding to the reconstructed full resolution frame includes the steps of:
encoding the original full resolution frame to generate an encoded full resolution frame,
storing coded data for the encoded full resolution frame, and
reconstructing and storing the encoded full resolution frame.

12. The system of claim 10, wherein generating the reconstructed reduced spatial resolution frame and coded data corresponding to the reconstructed reduced spatial resolution frame comprises the steps of:
downsampling the original full resolution frame to render the original full resolution frame into a reduced spatial resolution frame,
encoding the reduced spatial resolution frame, storing coded data for the reduced spatial resolution frame,
reconstructing and storing the reduced spatial resolution frame, and
upsampling and storing the reconstructed reduced spatial resolution frame.

13. The system of claim 11, wherein encoding the original full resolution frame further comprises applying discrete cosine transform-based downsampling to the original full resolution frame is.

14. The system of claim 12, wherein encoding the reduced spatial resolution frame further comprises applying discrete cosine transform-based upsampling to the reduced spatial resolution frame.

15. The system of claim 12, wherein upsampling and storing the reconstructed reduced spatial resolution frame further comprises applying tweening-based spatial interpolation to the reconstructed reduced spatial resolution frame.

16. The system of claim 10, wherein the coded data corresponding to the reconstructed full resolution frame and the coded data corresponding to the upsampled reconstructed reduced spatial resolution frame are each stored in a memory buffer.

17. The system of claim 10, wherein the first deviation and the second deviation are each determined based on a visual-perceptual metric.

18. The system of claim 17, wherein the visual-perceptual metric is a just noticeable difference metric.

* * * * *